United States Patent [19]

Timour et al.

[11] 4,101,003

[45] Jul. 18, 1978

[54] ISOLATED OIL PAN ASSEMBLY

[75] Inventors: Sune E. Timour, Columbus; Thomas D. Littrell, Scipio, both of Ind.

[73] Assignee: Cummins Engine Company, Inc., Columbus, Ind.

[21] Appl. No.: 758,582

[22] Filed: Jan. 12, 1977

[51] Int. Cl.[2] .............................................. F16N 31/00

[52] U.S. Cl. ................................ 184/106; 123/195 C; 123/198 E

[58] Field of Search ....................... 123/198 E, 195 C; 184/106; 181/33 K

[56] References Cited

U.S. PATENT DOCUMENTS

| | | | |
|---|---|---|---|
| 3,695,386 | 10/1972 | Thien et al. | 123/195 C X |
| 3,724,599 | 4/1973 | Heidacker | 123/198 E X |
| 4,027,644 | 6/1977 | Timour | 123/198 E |

*Primary Examiner*—David H. Brown

*Attorney, Agent, or Firm*—Neuman, Williams, Anderson & Olson

[57] ABSTRACT

An improved isolated oil pan assembly is provided for use on an internal combustion engine, such as a diesel engine, thereby eliminating a serious problem associated with prior engines of this type; namely, a source of undesirable noise. The improved pan assembly includes a pan which is secured to the underside of the engine block by a plurality of fastening means spaced from one another and disposed inwardly from the periphery of the pan. Each fastening means is positioned within an elongated sleeve-like pocket which is recessed from the underside of the pan and extends through and protrudes from an opening formed in the upper end of the pocket. The protruding portion of the fastening means is secured to a rigid stationary member disposed within the interior of the engine block. Each fastening means is isolated from the corresponding oil pan pocket by an isolator formed of resilient, vibration isolating, oil impervious material. The isolator is carried by the fastening means and is in seaing engagement with the upper end of the pocket locating the fastening means so that the fastening means is not in direct contact with the pan. Mounted on a ledge delimiting the open upper side of the pan is a continuous seal formed of suitable, resilient, vibration isolating, oil impervious material. The seal is in sealing engagement with the underside of the engine block thereby preventing any direct contact between the engine block and the oil pan ledge.

6 Claims, 5 Drawing Figures

FIG. 1
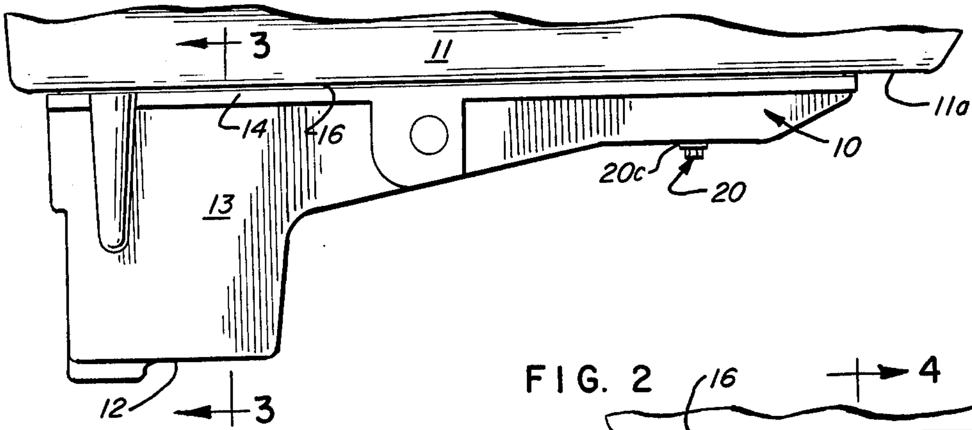
FIG. 2
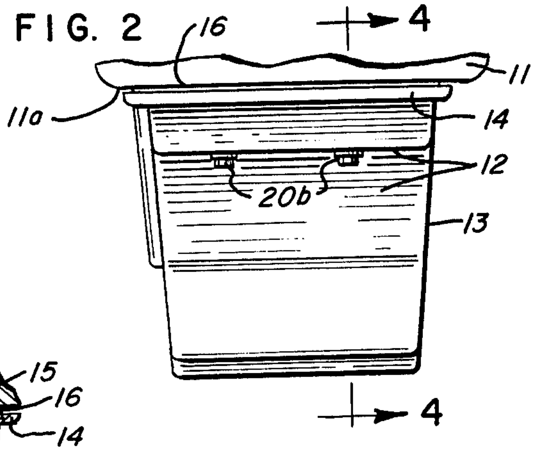
FIG. 3
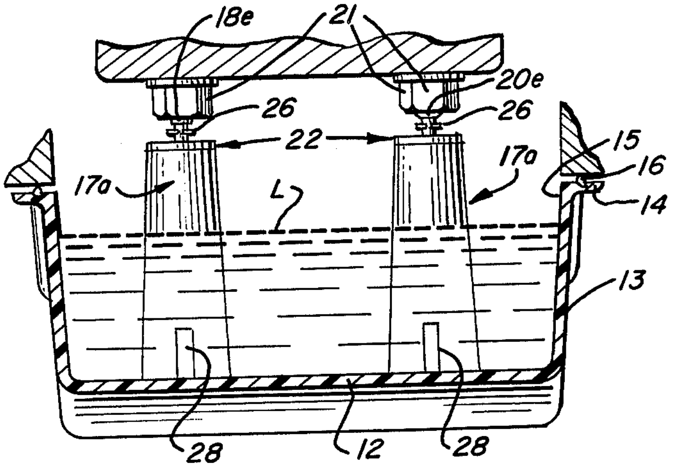
FIG. 5
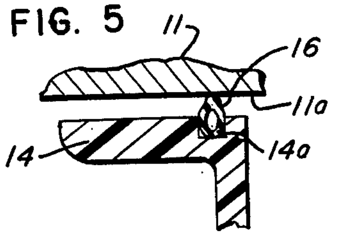
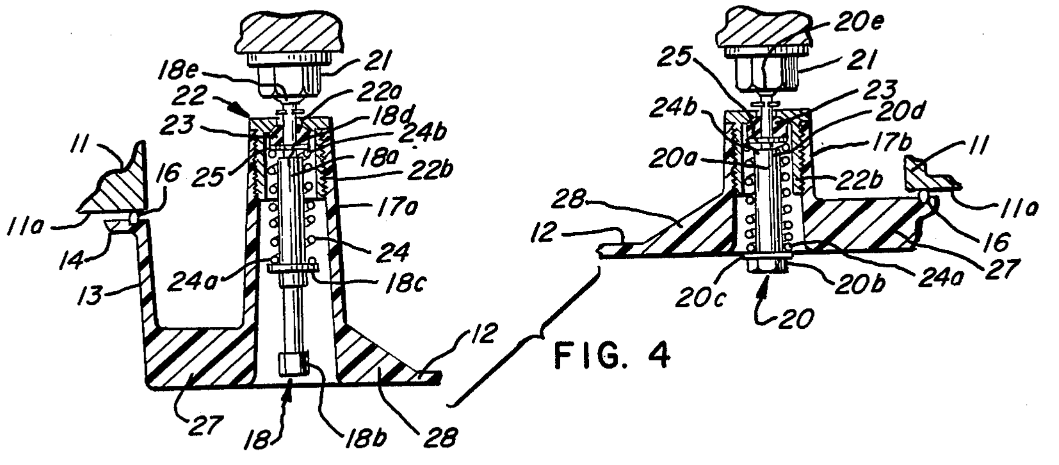
FIG. 4

ISOLATED OIL PAN ASSEMBLY

BACKGROUND OF THE INVENTION

Oil pans of this general type have heretofore been one of the prime sources of noise pollution produced during the operation of internal combustion engines embodying said pans. Various structural features, techniques and approaches have heretofore been employed in oil pans of this general type in an effort to remedy this problem; however, such efforts have been beset with one or more of the following shortcomings: (a) they are complex and costly, (b) they require numerous fastening devices, the access to which in certain instances is difficult and awkward, (c) they require special tools and the expenditure of an inordinate amount of manual labor to assemble or disassemble the pan with respect to the engine block, (d) an ineffective seal between the pan and the engine block results thereby rendering the engine readily prone to oil leakage, (e) the pan easily distorts or sags excessively when being installed or after it is in place thereby impairing the isolation of the pan from the engine block, and (f) the fastening devices are exposed in such a way as to be highly susceptible to breakage or damage due to shock from road obstructions or the like.

SUMMARY OF THE INVENTION

Thus, it is an object of the invention to provide an improved isolated oil pan assembly which avoids the aforenoted shortcomings.

It is a further object of the invention to provide an isolated oil pan assembly wherein an effective oil seal is obtained between the pan and the engine block, notwithstanding that the surface of the latter, engaged by the seal, does not have a smooth, uniform configuration.

It is a further object of the invention to provide an isolated oil pan assembly wherein an effective oil seal between the pan and the engine block can be obtained by using a substantially fewer number of fastening devices than has heretofore been required with oil pans of this general type.

It is a still further object of the invention to provide an isolated oil pan assembly wherein the fastening devices therefor significantly reduce the amount of vibrations which are transmitted to the oil pan from the engine block.

It is a still further object of the invention to provide an oil pan assembly wherein the peripheral flange formed thereon is isolated from the high vibration amplitudes produced by the engine block.

It is a still further object of the invention to provide an oil pan assembly having an oil pan which is of simple design and may be formed from relatively thin gauge, inexpensive material.

Further and additional objects will appear from the description, accompanying drawings and appended claims.

In accordance with one embodiment of the invention an improved isolated oil pan assembly is provided which is adapted to be secured to the underside of an engine block for an internal combustion engine (e.g., a vehicle diesel engine). The assembly includes a pan having a base delimited by upwardly extending side walls which terminate in a continuous, outwardly projecting ledge. The ledge defines the open top of the pan. The pan is secured to the underside of an engine block by a plurality of relatively spaced anchor bolts which are located inwardly relative to the ledge. Each anchor bolt is disposed within an elongated upwardly extending, sleeve-like pocket formed in the base. The shank of the bolt extends through an oversized opening formed in the upper end of the pocket and is secured to a rigid stationary member located within the interior of the engine block. Encompassing and carried on the bolt shank and forming an oil seal engagement with the portion of upper end of the pocket which is circumjacent the oversized opening therein is an annular isolator formed of resilient, vibration isolating, oil impervious material. Spaced longitudinally downwardly from the isolator is an abutment carried on the bolt shank. Encompassing the portion of the bolt shank intermediate the isolator and the abutment is a spring which resiliently engages the isolator and abutment. The isolator causes the bolt shank to be aligned in the oversized opening and to be out of the direct contact with the pan itself. Carried on the pan ledge and encompassing the pan open top is a continuous seal which is in resilient sealing engagement with the underside of the engine block. When the anchor bolts are properly secured to the stationary member, the continuous seal engages in oil sealing relation the underside of the engine block and effectively isolates the ledge from the engine block.

DESCRIPTION

For a more complete understanding of the invention reference should be made to the drawing wherein:

FIG. 1 is a fragmentary side elevational view of one form of the improved oil pan assembly shown mounted on the underside of an engine block.

FIG. 2 is a right end elevational view of the oil pan assembly and engine block of FIG. 1.

FIG. 3 is an enlarged sectional view taken along line 3—3 of FIG. 1.

FIG. 4 is an enlarged fragmentary sectional view taken along line 4—4 of FIG. 2.

FIG. 5 is an enlarged fragmentary vertical sectional view taken through a portion of the oil pan ledge shown in FIG. 4.

Referring now to the drawing and more particularly to FIG. 1, one form of the improved isolated oil pan assembly 9 is shown mounted on the underside **11*a* of an engine block 11. The engine block 11 forms a major component of a conventional internal combustion engine, e.g., a vehicle diesel engine. The assembly 9 includes an oil pan 10 of suitable metal or plastic material and having a base 12 which is delimited by upstanding side walls 13. The upper edges of the side walls form a continuous, outwardly extending ledge 14 which delimits an open top 15 of the pan, the latter being in communication with the interior of the engine block. The height of the side walls of a pan may vary, as shown in FIG. 1**, and will depend upon the configuration and location of the engine and the various components of the vehicle chassis.

As seen more clearly in FIG. 5, the ledge 14 is provided with a continuous groove **14*a* in which is disposed an endless ribbon-like seal 16 which is formed of suitable resilient, vibration isolating, oil impervious material. The seal 16 may be of a type disclosed in pending application Ser. No. 590,708 filed on June 26, 1975, now U.S. Pat. No. 4,027,644, in the name of Sune E. Timour. Seal 16 has a substantial portion thereof which projects upwardly from the upper surface of the ledge 14** and forms a narrow sealing contact with the underside 11*a* of the engine block 11 when the pan 10 is assembled on the block.

As noted in FIGS. 3 and 4, the base 12 of the pan is provided with a plurality (e.g., 4 or more) of relatively spaced, upwardly extending, sleeve-like pockets 17*a* and 17*b*. The height of the pockets will vary depending upon the location thereof on the base. In FIG. 4, for example, pockets 17*a* have a greater longitudinal dimension than pockets 17*b* because the latter are located in a shallow section of the pan whereas pockets 17*a* are located in a deep section. The upper ends of both pockets 17*a* and 17*b* are normally disposed in a substantially coplanar relation as seen in FIG. 4. This relationship while desirable is not essential. It is important, however, that the upper ends of the pockets terminate a substantial distance above the normal level L of the oil, which accummlates within the pan, so that leakage of the oil through the pockets is avoided.

The assembly 9 also includes a plurality of anchoring bolts 18, 20, one being disposed within each pocket 17*a*, 17*b*. Each bolt has the upper end thereof threaded into or otherwise secured to a rigid stationary member 21 which is disposed within the engine block 11. The stationary member 21 may comprise the main bearing cap bolts. By having the anchoring bolts secured to a rigid stationary member the amplitude of the vibrations developed during operation of the engine are the smallest at these locations.

The shank 18*a*, 20*a* of the bolt depends from the stationary member 21 and passes through the open top of the corresponding pocket. In the case of bolts 18, which are the longer of the two in the illustrated embodiment, the lower end 18*b* of the shank 18*a* terminates within the pocket adjacent the lower open end thereof. The lower end 18*b* of the bolt has a faceted configuration to facilitate turning thereof by a socket wrench or the like. In the case of bolt 20, the lower end 20*b* thereof, which also has a faceted configuration, may project a slight amount from the bottom of the pocket 17*b*.

Mounted on the upper end of pocket 17*a*, 17*b* is a cover piece 22 which is provided with an oversized central opening 22*a* through which the shank 18*a*, 20*a* extends. The underside of the opening 22*a* is countersunk for a purpose to be hereinafter described. In the illustrated embodiment, piece 22 is provided with depending sleeve-like portion 22*b* which is externally threaded and engages internal threads formed in the upper end of each pocket. Alternatively it can be externally modified to more securely engage the material of the pan (i.e. molded in place).

Resiliently and sealingly engaging the countersunk side of opening 22*a* is an annular isolator 23 which is formed of resilient, vibration isolating, oil impervious material. The isolator has a center opening through which the bolt shank extends. The portion of the isolator engaging the cover piece 23 is of frustoconical configuration which conforms substantially to the shape of the countersunk surface. Thus, when the isolator engages the countersunk surface the isolator will be self-aligning with respect to said surface. Other shapes also may be used such as a cylindrical isolator with a flange. The isolator 23 in the illustrated embodiment is retained in proper sealing engagement with the cover piece 22 by a coil spring 24 which encompasses the bolt shank. The lower end 24*a* of the spring 24 engages a shoulder 18*c*, 20*c* formed on the shank 18*a*, 20*a*, respectively. The upper end 24*b* of the spring 24 engages a suitable washer or the like 25 which, in turn, contacts the underside of the isolator 23. The amount of spring force exerted on the underside of the isolator 23 will depend upon the extent to which the bolt shank is threaded into the stationary member 21. In certain instances the spring may be eliminated and a shoulder 18*d*, 20*d*, formed on the bolt shank, may directly engage the underside of the isolator 23. It has been found, however, that the use of the spring in combination with the isolator is preferred.

Where the spring 24 is utilized, it is desirable to preload the spring thereby more effectively preventing accidental separation of the pan from the block while the vehicle is experiencing periods of high acceleration. Spring preloading can be accomplished prior to assembling the pan on the engine block by merely compressing the spring 24 and then mounting a keeper snap ring 26 on the bolt shank 18*a*, 20*a* at a position above the cover piece 22. Once the anchor bolts have been threaded into the stationary member 21, the ring 26 will be out of contact with regard to the cover piece 22 and, thus, there is no direct contact between the bolt shank and the oil pan except through the isolator 23. The keeper ring may also be located below the ring 18c or washer 20*c*. The spring would be kept in compression and the bolt would be free for easy installation.

To provide stability for the pockets 17*a*, 17*b*, reinforcing ribs 27, 28 may be formed in the pan. Rib 27 is located so as to bridge the distance between the pocket exterior and the adjacent side wall 13 of the pan. Rib 28, on the other hand, is in the form of a triangular gusset which extends from the exterior of the pocket to a segment of the base 12 of pan. Ribs 27, 28 in the illustrated embodiment are diametrically opposed to one another; however, the relative arrangement and the number of reinforcing ribs to be embodied in the oil pan may be varied from that shown without departing from the scope of the invention.

As aforementioned, the anchoring bolts are threaded into rigid stationary members 21, disposed within the engine block, and as a result, the relative movement of the pan with respect to the engine block is substantially confined to vertical motion which is absorbed by the isolators 23 and the seal 16.

The shoulder 18*d*, 20*d* formed on the shank of the anchor bolt 18, 20 prevents loss of the oil pan with respect to the engine block in the event of a spring failure. To prevent over-tightening of the anchor bolt with respect to the stationary member 21, an additional shoulder 18*e*, 20*e* may be provided on the bolt shank which will abut the underside of the stationary member 21, once the bolt has been threaded into the member 21 the maximum amount without surpassing the yield point of the bolt material.

The number of anchoring bolts to properly secure the oil pan to the engine block will depend upon the physical dimensions of the pan itself. In any case, however, the number of anchoring bolts to be utilized is significantly less than was customarily used in prior oil pan installations. Because of the disposition and configuration of the seal 16, the amount of force required to hold the pan in place so as to prevent oil leakage and provide a marked diminution of noise due to vibration is substantially less than is required with prior oil pan constructions. Thus, the effective life of the seal and isolators is substantially improved, thereby reducing maintenance and servicing costs.

We claim:

1. An isolated oil pan assembly for mounting on the underside of an engine block wherein the interior of the latter is provided with rigid stationary means, said assembly comprising a pan for accumulating therein a predetermined amount of oil, said pan having a base, upstanding side walls connected to and delimiting said base, and a continuous ledge extending laterally from the upper edge of said side walls and delimiting an open top of said pan, said ledge being disposed above the level of the predetermined amount of accumulated oil, said open top being adapted to communicate with the interior of said engine block; a continuous seal of resilient vibration isolating, oil impervious material carried on said ledge for sealingly engaging the underside of said engine block; a plurality of elongated sleeve-like pockets formed in said base and extending upwardly therefrom and adapted to be in vertical alignment with the rigid stationary means, said pockets being disposed within an area delimited by said ledge; and a plurality of fastening means, one for each pocket, being disposed within said pockets and adapted to be secured to the rigid stationary means; each fastening means including an elongated element having the upper end thereof projecting through an opening formed in the upper end of the pocket and adapted to be secured to the rigid stationary means aligned therewith, an isolator formed of resilient vibration isolating, oil impervious material encompassing and being carried on and supported by a portion of said elongated element and sealingly engaging the portion of the pocket upper end cirumjacent the opening therein wherein said elongated element is isolated from said oil pan, said pan being adapted to be secured to the underside of the engine block by said elongated elements through the respective isolators.

2. The oil pan assembly of claim 1 wherein each pocket of the pan has the upper end thereof projecting a substantial distance above the level of a plane defined by the ledge of the pan.

3. The oil pan assembly of claim 1 wherein the elongated element of the fastening means is provided with an abutment disposed intermediate the isolator and the free end of said element and spaced longitudinally of said isolator; said assembly including spring means disposed intermediate said abutment and said isolator and resiliently engaging and urging said isolator into sealing engagement with the upper end of the pocket.

4. The oil pan assembly of claim 1 wherein the upper end of each pocket of the pan includes a cover piece provided with an opening oversized relative to the elongated element which extends therethrough, the opening being countersunk on a side thereof engaged by said isolator.

5. The oil pan assembly of claim 1 wherein the pockets of the pan are spaced relative to one another inwardly from the ledge and each pocket includes laterally extending reinforcing means interconnecting the exterior of said pocket with adjacent portions of said base.

6. The oil pan assembly of claim 5 wherein at least a portion of the reinforcing means extends from the exterior of a pocket to an adjacent side wall of the pan.

* * * * *